United States Patent [19]

Luckowski et al.

[11] 4,326,729
[45] Apr. 27, 1982

[54] BICYCLE TRAINING WHEEL BRACKET SUPPORT

[76] Inventors: Edwin E. Luckowski, 119 Marion Ave.; Lester M. Bainbridge, 213 Charles St., both of Belle Vernon, Pa. 15012

[21] Appl. No.: 169,424

[22] Filed: Jul. 16, 1980

[51] Int. Cl.³ .............................................. B62H 1/12
[52] U.S. Cl. ..................................... 280/304; 280/293
[58] Field of Search ................ 280/293, 295, 298, 304

[56] References Cited

U.S. PATENT DOCUMENTS

| | | | |
|---|---|---|---|
| 2,527,431 | 10/1950 | Kutil | 280/293 |
| 2,530,498 | 11/1950 | Atwood et al. | 280/293 |
| 2,647,764 | 8/1953 | Anderson | 280/293 |
| 2,793,877 | 5/1957 | Meier, Jr. | 280/293 |
| 2,817,540 | 12/1957 | Pawset | 280/293 |
| 2,828,141 | 3/1958 | Erstad et al. | 280/304 |
| 3,642,305 | 2/1972 | Pawset | 280/293 |
| 3,746,367 | 7/1973 | Johannsen | 280/301 |
| 3,877,727 | 4/1975 | Johannsen | 280/301 |

Primary Examiner—Joseph F. Peters, Jr.
Assistant Examiner—Donn McGiehan
Attorney, Agent, or Firm—Finnegan, Henderson, Farabow, Garrett and Dunner

[57] ABSTRACT

A bicycle training wheel bracket support for supporting the bracket at a desired height, comprising a brace member having a first portion apertured to accommodate the threaded end portion of a bicycle rear wheel axle, and a second portion comprising a torque arm having a forked extremity for embracing a bicycle frame, a housing secured between the first and second portions of the brace member, a substantially vertically extending sheath secured within the housing for receiving the training wheel bracket, said sheath having a transversely disposed aperture extending therethrough and situated for alignment with a selected one of the bracket apertures, a movable locking pin supported within the housing for substantially horizontal movement into the sheath aperture and a selected one of the bracket apertures, said locking pin being spring-biased into said apertures for locking the bracket at the desired height, and at least one projection rigidly secured to the locking pin and extending through an opening in the housing for manually moving the locking pin out of the bracket against the spring bias for permitting movement of the training wheel bracket within the sheath for alignment of another selected one of the bracket apertures with the sheath aperture. In the preferred embodiment a pair of substantially parallel retaining plates are affixed to the interior of the housing, and the locking pin is secured to a support bar which is situated between the retaining plates, with the support bar extending substantially parallel to the bicycle axis and having the locking pin extending transversely therefrom.

14 Claims, 5 Drawing Figures

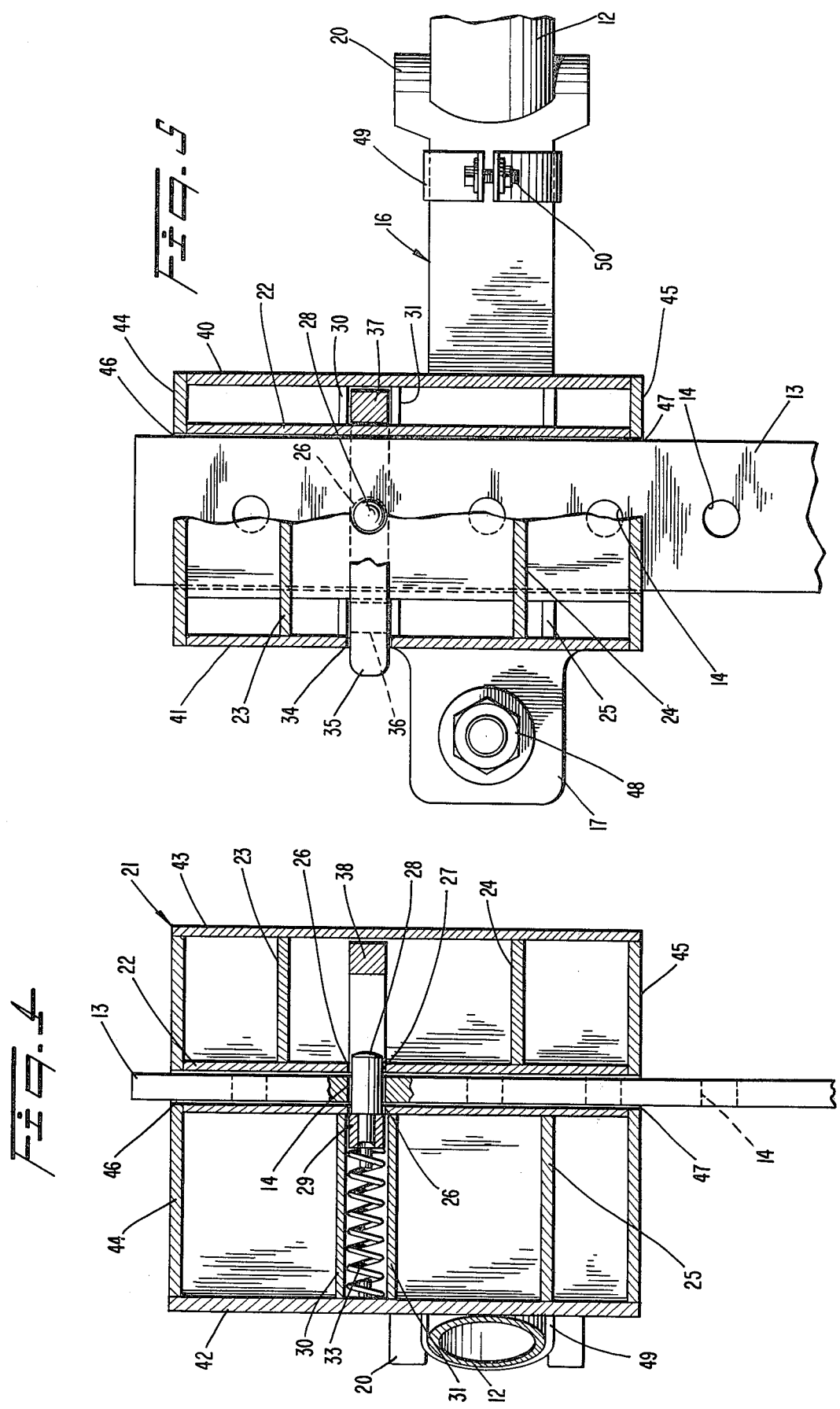

BICYCLE TRAINING WHEEL BRACKET SUPPORT

BACKGROUND OF THE INVENTION

The present invention relates to a bicycle training wheel bracket support, and more particularly to a device for attachment to a bicycle for supporting an apertured training wheel bracket and associated training wheel at a desired height.

Prior art training wheel bracket supports do not permit ready adjustment of the height of the training wheel with respect to the bicycle frame. Generally, the prior art devices require mechanical tools and extensive effort to adjust the height of the training wheels. Typically, the training wheels are bolted to the bicycle frame through apertures in the training wheel support brackets. Height adjustment thus requires removal of the bolts, removal of the bracket from a threaded nut, alignment of the desired bracket aperture with the threaded nut, and once again securing the bolt to the threaded nut.

The above-noted prior art height adjustment procedure obviously requires considerable time and effort, and therefore highly undesirable.

SUMMARY OF THE INVENTION

The present invention overcomes the problems and disadvantages of the prior art by providing a bicycle training wheel bracket support which permits ready height adjustment of the training wheel bracket and associated training wheel without the need for mechanical tools, and without requiring removal of any bolts.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects, and in accordance with the purpose of the invention as embodied and broadly described herein, the bicycle training wheel bracket support of this invention comprises a brace member having a rear end portion apertured to accommodate the threaded end portion of a bicycle rear wheel axle, and a front end portion comprising a torque arm having a forked extremity for embracing the bicycle frame, a housing secured between the front and rear end portions of the brace member and having a substantially vertically extending sheath secured therein for receiving an apertured training wheel bracket, said sheath having a transversely disposed aperture extending therethrough and situated for alignment with a selected one of the bracket apertures, a movable locking pin supported within the housing for substantially horizontal movement into the sheath aperture and a selected one of the bracket apertures, said locking pin being spring-biased into said apertures for locking the bracket at the desired height, and means extending through an opening in the housing for manually moving the locking pin out of the bracket aperture for permitting movement of the training wheel bracket within the sheath for alignment of another selected one of the bracket apertures with the sheath aperture.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 4 is a sectional view of the preferred embodiment of the invention taken along line 4—4 of FIG. 1; and FIG. 5 is a sectional view of the preferred embodiment of the invention taken along lines 5—5 of FIG. 3.

DESCRIPTION OF THE PREFERRED EMBODIMENT

Reference will now be made in detail to the presently preferred embodiment of the invention, an example of which is illustrated in the accompanying drawings.

Figures 1, 2:
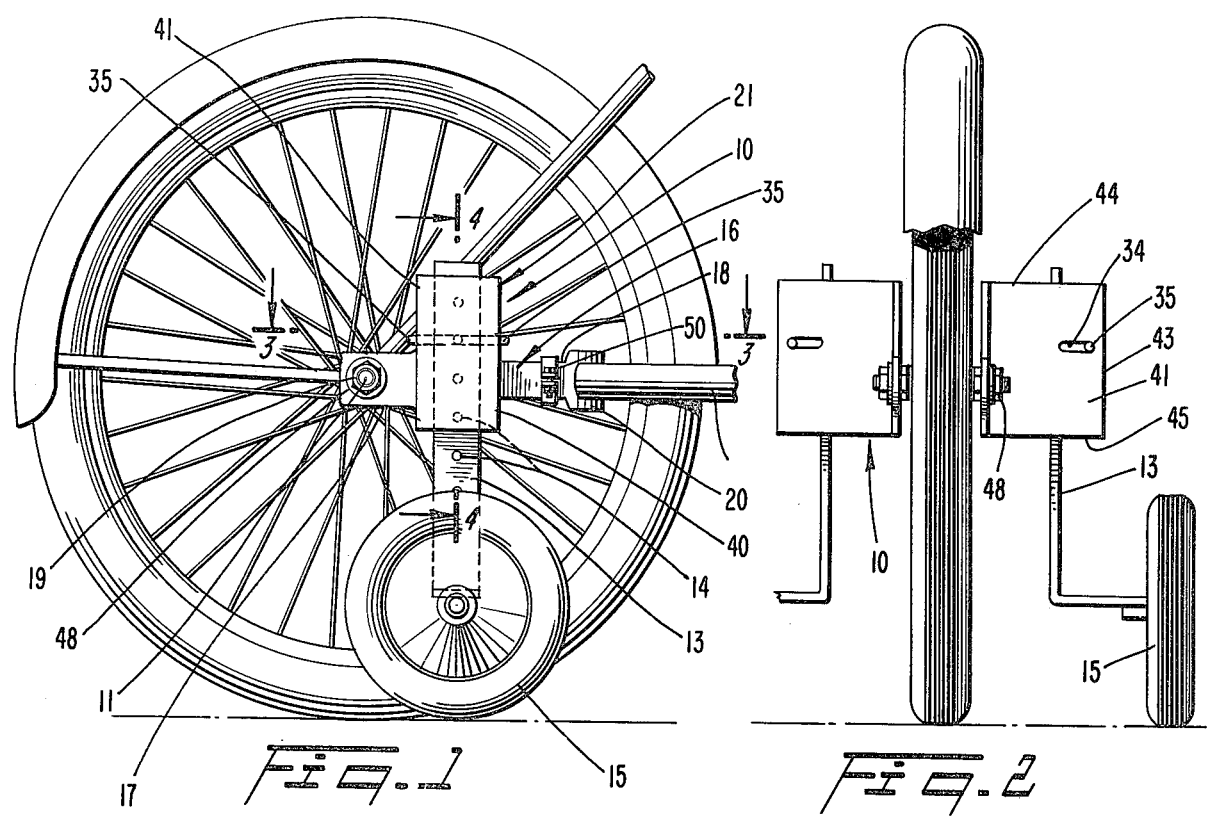
FIG. 1 is a general schematic diagram of a bicycle training wheel bracket support constructed in accordance with the present invention viewed from the side of the bicycle and showing the rear portion of the bicycle.
FIG. 2 is a general schematic diagram of the bicycle training wheel bracket support of the present invention viewed from the rear of the bicycle.

The preferred embodiment of the bicycle training wheel bracket support is shown in FIGS. 1-5, and is represented generally in these figures by the numeral 10. The support is designed for attachment to a bicycle, and more particularly to the threaded end portion 11 of a bicycle rear wheel axle and to the bicycle frame 12, as shown in partial cutaway in FIGS. 1 and 2. Support 10 is designed for supporting a training wheel bracket 13 at a desired height. As shown in FIGS. 1 and 2, training wheel bracket 13 includes numerous height adjustment apertures 14 and is adapted to support training wheel 15 at its lower end.

Support 10 includes a brace member designated generally by numeral 16, having a rear end portion 17 and a front end portion 18. Rear end portion 17 includes an aperture 19 for accommodating the threaded end portion 11 of the bicycle rear wheel axle, and front end portion 18 comprises a torque arm having a forked extremity 20 for embracing bicycle frame 12.

Figure 3:
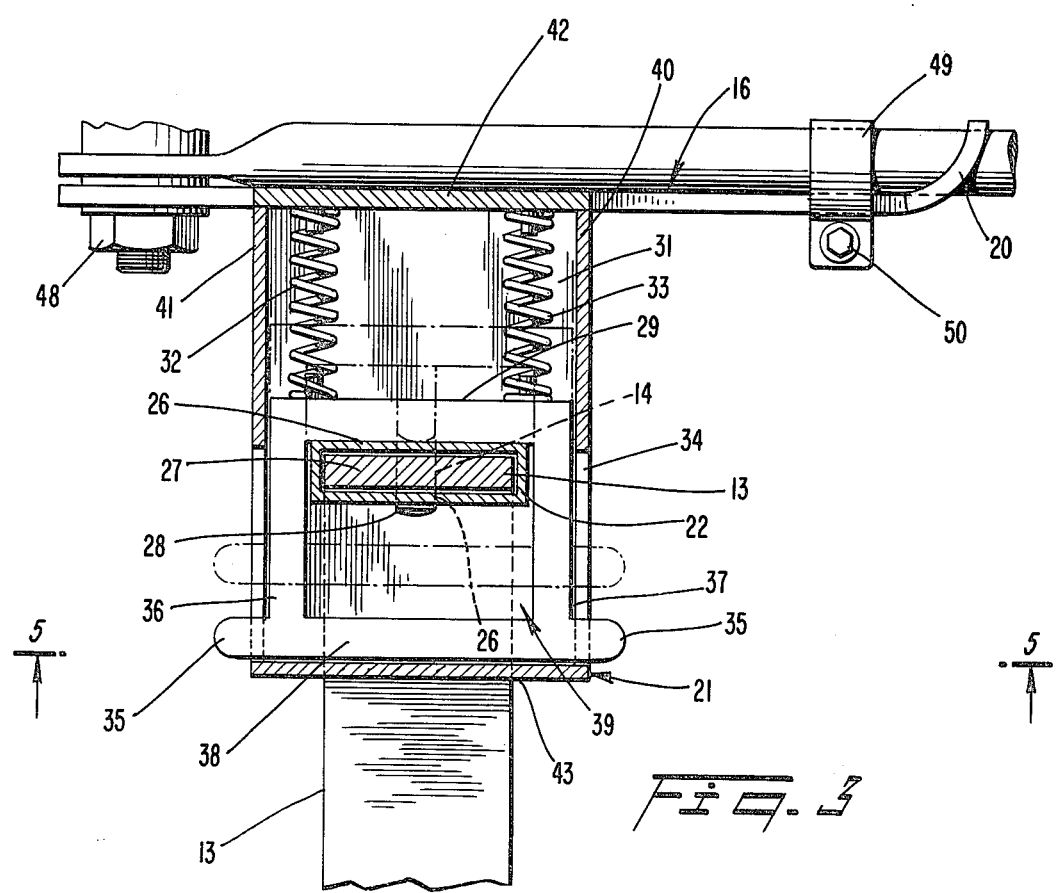
FIG. 3 is a sectional view of the preferred embodiment of the invention taken along line 3—3 of FIG. 1.

A housing 21 is secured between rear end portion 17 and front end portion 18 of brace member 16. As best shown in FIGS. 3 and 4, housing 21 includes a substantially vertically extending sheath 22 rigidly secured therein for receiving training wheel bracket 13. Sheath 22 may be secured within housing 21, for example, through the use of supporting braces 23, 24 and 25 rigidly secured to the internal walls of the housing. Sheath 22 includes a transversely disposed aperture 26 extending therethrough and situated for alignment with the bracket apertures 14 when the bracket is placed within the sheath.

In accordance with the invention, support 10 further includes a movable locking pin 27 supported within housing 21 for substantially horizontal movement into sheath aperture 26 and bracket apertures 14, as best shown in FIGS. 3 and 4. Locking pin 27 is preferably tapered at its free end 28 for ease of entry into apertures 26 and 14. As shown in FIGS. 3 and 4, locking pin 27 is spring-biased into sheath aperture 26 and a bracket aperture 14 for locking bracket 13 at the desired height. Preferably, locking pin 27 is secured to, and supported within housing 21 by support bar 29 situated between retaining plates 30 and 31, which are rigidly secured to the interior walls of housing 21. As best shown in FIGS. 3 and 4, support bar 29 extends substantially parallel to the bicycle axis and locking pin 27 extends transversely from support bar 29.

Preferably, locking pin 27 is spring-biased through the use of a pair of compression springs 32 and 33 situated between retaining plates 30 and 31. As shown in FIGS. 3 and 4, compression springs 32 and 33 are preferably positioned between an interior housing wall and the respective ends of support bar 29 so as to bias locking pin 27 into sheath aperture 26 and a bracket aperture 14.

In accordance with the invention, support 10 further includes means extending through an opening in housing 21 for manually moving locking pin 27 out of a bracket aperture 14 for permitting vertical movement of training wheel bracket 13 within sheath 22 for alignment of other bracket apertures 14 with sheath aperture 26.

As embodied herein, this means for manually moving the locking pin includes at least one, and preferably two, projections 35 rigidly secured to locking pin 27. Projections 35 may be secured directly to the respective ends of support bar 29 or, preferably, as shown in FIG. 3, a pair of opposed side bars 36 and 37 may be secured to, or integral with, the respective end portions of support bar 29, and the projections 35 may be secured to the free ends of the respective side bars 36, 37. Preferably, a connecting bar 38 rigidly secures the respective free ends of side bars 36 and 37 together.

As can be seen in FIG. 3, when support bar 29, side bars 36 and 37 and connecting bar 38 are employed, these bars form an opening 39. In this embodiment, sheath 22 is situated within opening 39 and locking pin 27 projects into opening 39, i.e., away from bicycle frame 12, and is spring-biased in this same general direction.

In operation, support bar 29 and locking pin 27 attached thereto, as well as side bars 36 and 37 and connecting bar 38 are normally biased in a direction away from bicycle frame 12 by compression springs 32 and 33. This biasing force secures locking pin 27 within sheath aperture 26 and a selected one of the training wheel bracket apertures 14. When it is desired to alter the height of training wheel 15, projections 35 are pushed inwardly toward bicycle frame 12 a sufficient distance to remove locking pin 27 from bracket aperture 14, thus permitting vertical movement of the training wheel bracket 13 for alignment of another selected one of the bracket apertures 14 with sheath aperture 26 at the desired training wheel height. Upon reaching such alignment, projections 35 are released and locking pin 27 is biased into the aperture 14, thus locking and supporting bracket 13 at the desired height.

In accordance with the invention, housing 21 may be box-like in design, having front and rear walls 40 and 41, respectively, proximate the front and rear end portions of brace member 16, respectively with the front and rear walls 40 and 41 being secured to one another through opposing side walls 42 and 43 and opposing top and bottom walls 44 and 45, respectively. Top and bottom walls 44 and 45 are constructed with openings 46 and 47 which are of a size sufficient to permit passage of the training wheel bracket 13 therethrough. Preferably, side wall 42 is integral with brace member 16.

In accordance with the invention, support 10 further includes a nut 48 for securing the rear end portion 17 of brace member 16 to the threaded end portion 11 of the bicycle rear wheel axle, and also includes an adjustable band 49 for securing torque arm 18 to the bicycle frame 12. Preferably, band 49 is adjusted by a tightening screw 50 extending through opposite ends of the band.

In the preferred embodiment of the invention, conventional rigid construction materials such as, for example, steel or aluminum may be used to construct the various parts of the invention. In a typical embodiment of the invention, housing front and rear sides 40 and 41 are approximately three and one-fourth inches long and side walls 42 and 43 are approximately two and one-fourth inches long. Bracket 13 may, for example, be one and one-fourth inches by one-fourth inch in cross section.

It will be apparent to those skilled in the art that various modifications and variations can be made in the bicycle training wheel bracket support of the present invention without departing from the scope or spirit of the invention. As an example, housing 21 may be constructed in any convenient shape, and is not limited to a box-like shape. Thus, it is intended that the present invention cover the modifications and variations of this invention, provided they come within the scope of the appended claims and their equivalents.

What is claimed is:

1. Apparatus for attachment to a bicycle for supporting an apertured training wheel bracket at a desired height, comprising:
   (a) a brace member having a first portion apertured to accommodate the threaded end portion of a bicycle rear wheel axle, and a second portion comprising a torque arm having a forked extremity for embracing a bicycle frame;
   (b) a housing secured between the first and second portions of the brace member;
   (c) a substantially vertically extending sheath secured within the housing for receiving the training wheel bracket, said sheath having a transversely disposed aperture extending therethrough and situated for alignment with a selected one of the bracket apertures;
   (d) a movable locking pin supported within the housing for substantially horizontal movement into the sheath aperture and a selected one of the bracket apertures, said locking pin being spring-biased into said apertures for locking the bracket at the desired height; and
   (e) means extending through an opening in the housing for manually moving the locking pin out of the bracket aperture against the spring bias for permitting movement of the training wheel bracket within the sheath for alignment of another selected one of the bracket apertures with the sheath aperture.

2. Apparatus as claimed in claim 1, wherein said means for manually moving the locking pin comprises at least one projection rigidly secured to the locking pin.

3. Apparatus as claimed in claim 2, further comprising a pair of substantially parallel retaining plates affixed to the interior of the housing, and a support bar secured to the locking pin and situated between the plates for supporting the locking pin, the support bar extending substantially parallel to the bicycle axis and having the locking pin extending transversely therefrom.

4. Apparatus as claimed in claim 3, including a pair of projections secured to the locking pin through the respective ends of the support bar and extending through openings in opposing walls of the housing.

5. Apparatus as claimed in claim 1, wherein the housing is box-like, having front and rear walls proximate the second and first portions of the brace member, respectively, and having opposing side walls and opposing top and bottom walls, the front and rear walls being secured to one another through the side walls and the top and bottom walls, and the top and bottom walls having openings for the training wheel bracket.

6. Apparatus as claimed in claim 5, wherein the side wall adjacent the bicycle frame is integral with the brace member.

7. Apparatus as claimed in claim 5, further comprising at least one rigid, internal supporting brace secured to the front, rear and side walls of the housing.

8. Apparatus as claimed in claim 1, wherein the free end of the locking pin is tapered.

9. Apparatus as claimed in claim 1, further comprising a nut for securing the apertured first portion of the brace member to the threaded end portion of the bicycle rear wheel axle, and an adjustable band for securing the torque arm of the brace member to the bicycle frame.

10. Apparatus for attachment to a bicycle for supporting an apertured training wheel bracket at a desired height, comprising:
(a) a brace member having a first portion apertured to accommodate the threaded end portion of a bicycle rear wheel axle, and a second portion comprising a torque arm having a forked extremity for embracing a bicycle frame;
(b) a housing secured between the first and second portions of the brace member;
(c) a substantially vertically extending sheath secured within the housing for receiving the training wheel bracket, said sheath having a transversely disposed aperture extending therethrough and situated for alignment with a selected one of the bracket apertures;
(d) a movable locking pin supported within the housing for substantially horizontal movement into the sheath aperture and a selected one of the bracket apertures;
(e) a pair of substantially parallel retaining plates affixed to the interior of the housing;
(f) a support bar secured to the locking pin and situated between the retaining plates for supporting the locking pin, the support bar extending substantially parallel to the bicycle axis and having the locking pin extending transversely therefrom;
(g) a pair of compression springs situated between the retaining plates and positioned between an interior housing wall and the respective ends of the support bar for biasing the locking pin into the sheath aperture and a selected one of the bracket apertures; and
(h) a pair of projections extending through openings in the housing and secured to the locking pin through the respective ends of the support bar for manually moving the locking pin out of the bracket aperture against the spring bias for permitting movement of the training wheel bracket within the sheath for alignment of another selected one of the bracket apertures with the sheath aperture.

11. Apparatus as claimed in claim 10, further comprising a pair of opposed side bars secured to and extending transversely from the respective ends of the support bar, wherein the projections are secured to the free ends of the respective side bars.

12. Apparatus claimed in claim 11, further comprising a connecting bar for rigidly securing the respective free ends of the side bars together.

13. Apparatus as claimed in claim 12, wherein the sheath for receiving the training wheel bracket is situated within an opening formed by the adjoined support bar, side bars and connecting bar, and wherein the locking pin projects into said opening and is biased away from the bicycle frame.

14. Apparatus for attachment to a bicycle for supporting an apertured training wheel bracket at a desired height, comprising:
(a) a brace member having a first portion apertured to accommodate the threaded end portion of a bicycle rear wheel axle, and a second portion comprising a torque arm having a forked extremity for embracing a bicycle frame;
(b) a box-like housing secured between the first and second portions of the brace member;
(c) a substantially vertically extending sheath secured within the housing for receiving the training wheel bracket, said sheath having a transversely disposed aperture extending therethrough and situated for alignment with a selected one of the bracket apertures;
(d) at least one rigid, internal supporting brace secured to the internal walls of the housing;
(e) a nut for securing the apertured first portion of the brace member to the threaded end portion of the bicycle rear wheel axle;
(f) an adjustable band for securing the torque arm of the brace member to the bicycle frame;
(g) a movable locking pin supported within the housing for substantially horizontal movement into the sheath aperture and a selected one of the bracket apertures;
(h) a pair of substantially parallel retaining plates affixed to the interior walls of the housing;
(i) a four-sided, locking pin support ring having first and second segments extending substantially parallel to the bicycle axis, the first segment lying nearest the bicycle frame, and opposed side segments secured to and extending transversely from the ends of the first and second segments, the first segment and the side segments being supported by the retaining plates, wherein the sheath for receiving the training wheel bracket is situated within the ring opening and wherein the locking pin is secured to the first segment and extends into the ring opening;
(j) a pair of compression springs situated between the retaining plates and positioned between the interior housing wall nearest the bicycle frame and the first segment for biasing the locking pin into the sheath aperture and a selected one of the bracket apertures; and
(k) a pair of projections extending through openings in the housing and secured to the locking pin through the respective ends of the second segment for manually moving the locking pin out of the bracket aperture against the spring bias for permitting movement of the training wheel bracket within the sheath for alignment of another selected one of the bracket apertures with the sheath aperture.

* * * * *